US012213219B2

(12) United States Patent
Kim et al.

(10) Patent No.: US 12,213,219 B2
(45) Date of Patent: Jan. 28, 2025

(54) LED DRIVING CIRCUIT AND DRIVING METHOD

(71) Applicant: LX Semicon Co., Ltd., Daejeon (KR)

(72) Inventors: Sang Suk Kim, Daejeon (KR); Jang Su Kim, Daejeon (KR); Ji Hwan Kim, Daejeon (KR); Kyeong Rok Lee, Daejeon (KR); Jong Min Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 112 days.

(21) Appl. No.: 18/194,097

(22) Filed: Mar. 31, 2023

(65) Prior Publication Data

US 2024/0049370 A1 Feb. 8, 2024

(30) Foreign Application Priority Data

Aug. 5, 2022 (KR) ........................ 10-2022-0097654

(51) Int. Cl.
*H05B 45/10* (2020.01)
*H05B 45/14* (2020.01)
*H05B 45/325* (2020.01)
*H05B 45/38* (2020.01)
*H05B 45/40* (2020.01)

(52) U.S. Cl.
CPC ........... *H05B 45/14* (2020.01); *H05B 45/325* (2020.01); *H05B 45/38* (2020.01); *H05B 45/40* (2020.01)

(58) Field of Classification Search
CPC ...... H05B 45/10; H05B 45/14; H05B 45/325; H05B 45/38; H05B 45/40; H05B 47/10
See application file for complete search history.

(56) References Cited

U.S. PATENT DOCUMENTS 10,750,595 B1 8/2020 Ozalevli et al.
2015/0189706 A1* 7/2015 Yang ..................... H05B 45/46 315/224

* cited by examiner

*Primary Examiner* — Jimmy T Vu
(74) *Attorney, Agent, or Firm* — POLSINELLI PC

(57) ABSTRACT

The present disclosure relates to an LED driving circuit for controlling the voltage of an LED backlight system, and to a technology for controlling the driving voltage of an LED string formed at one end of the LED string through a digital counter by monitoring the output voltage of the LED string.

20 Claims, 11 Drawing Sheets

LED DRIVING CIRCUIT AND DRIVING METHOD

CROSS-REFERENCE TO RELATED APPLICATION

This application claims the priority of Korea Patent Application No. 10-2022-0097654 filed on Aug. 5, 2022, which is hereby incorporated by reference in its entirety.

BACKGROUND

Field of the Disclosure

The present disclosure relates to a light emitting diode (LED) driving circuit and a driving method of the same.

Description of the Background

With the progress of informatization, various display devices capable of visualizing information are being developed. A liquid crystal display (LCD), an organic light emitting diode (OLED) display, a plasma display panel (PDP), and the like are representative examples of display devices that have been or are being developed. Such display devices are advancing to properly display high-resolution images.

In LED display technology, a required number of modular LED pixels may be arranged to constitute a single large panel. Alternatively, in LED display technology, a required number of unit panels each being composed of a plurality of LED pixels may be arranged to form a single large panel structure. In this manner, a large display device may be easily implemented by arranging a required number of LED pixels in the LED display technology.

LED display devices are advantageous not only in increasing the size but also in diversifying the panel size, and in the LED display technology, horizontal and vertical sizes may be variously adjusted according to appropriate arrangement of LED pixels.

Meanwhile, LED display devices may transmit a pulse width modulation (PWM) driving control signal, a pulse amplitude modulation (PAM) driving control signal, and the like to a channel terminal of an LED to control an output voltage V_CH of an LED string formed at one end of the LED, an LED current I_LED flowing through the LED, and the like.

To precisely control the brightness of the LED, it is necessary to control the output voltage V_CH of the LED string, the LED current I_LED flowing through the LED, and at the same time, it is necessary to appropriately control a driving voltage V_LED of the LED string.

In particular, noise affecting driving of the current of an adjacent channel may be generated when a current source and transistors connected to the channel of the LED string are directly turned on/off, and flickering caused by change in the brightness of the LED according to a frequency during an LED control process needs to be appropriately reduced.

The description in this section is only to provide background information and does not constitute an admission of prior art.

SUMMARY

Accordingly, the present disclosure is directed to a light emitting diode driving circuit and a driving method of the same that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present aspect is to provide an LED driving circuit for controlling an output voltage V_CH of an LED string and/or a driving voltage V_LED of the LED string to improve the precision of LED brightness control in an LED driving process, and a display device including the same.

The present aspect is also to provide an LED driving circuit for generating a feedback control signal using a digital logic circuit, for example, a digital counter, when a channel terminal voltage of an LED string is monitored as a voltage lower than a reference voltage and controlling the output voltage V_CH of the LED string or the driving voltage V_LED of the LED string, and a display device including the same.

The present aspect is also to provide an LED driving circuit capable of controlling the driving voltage of an LED string by a booster converter instead of directly adjusting the output voltage of the LED string to reduce noise that may affect other channels such as adjacent LED strings by counting clocks transmitted from the outside or clocks generated therein through a digital logic circuit to generate a feedback control signal, and a display device including the same.

To accomplish the above-described these and other advantages and in accordance with the present disclosure, as embodied and broadly described, an LED driving circuit includes a headroom detection circuit for detecting an output voltage V_CH of an LED string; a digital logic circuit for generating a channel enable signal CH_EN of the LED string to control the output voltage V_CH of the LED string; a channel control circuit for controlling the level of the output voltage V_CH of the LED string in response to the timing of the channel enable signal CH_EN of the digital logic circuit; and a feedback transistor for receiving the output voltage of the LED string detected by the headroom detection circuit, wherein the feedback transistor is electrically connected to a microcontroller unit to adjust the driving voltage V_LED of the LED string, and the microcontroller unit measures a current flowing through the feedback transistor and generates a feedback control signal for adjusting the level of the driving voltage V_LED of the LED string to control an operation of a boost converter.

In another aspect of the present disclosure, an LED driving circuit includes a headroom detection circuit for detecting an output voltage V_CH of an LED string formed at one end of the LED string; a digital logic circuit for counting clocks of an external vertical synchronization signal VSYNC or an internal PWM clock signal to determine a feedback timing when the headroom detection circuit determines that the output voltage V_CH of the LED string is equal to or less than a preset reference voltage V_REF; a feedback transistor for receiving an output signal of the digital logic circuit; and a feedback control circuit connected to a first terminal of the feedback transistor and determining whether to adjust the driving voltage V_LED of the LED string based on a current value flowing through the first terminal.

In a further aspect of the present disclosure, an LED driving method includes monitoring an output voltage V_CH of an LED string and determining whether the output voltage V_CH is equal to or less than a reference voltage V_REF; determining a feedback timing by counting clocks of an external vertical synchronization signal VSYNC or an internal PWM clock signal when the output voltage V_CH of the LED string is equal to or less than the reference voltage V_REF; and adjusting the intensity of the driving voltage V_LED of the LED string during the feedback timing.

As described above, according to the present aspect, the LED driving circuit may precisely adjust the brightness of an LED string by monitoring the output voltage or the LED current of the LED string.

According to the present aspect, the LED driving circuit may reduce noise such as current change that may occur in an adjacent channel and eliminate or mitigate flickering of a display device by directly turning on/off a circuit connected to a channel terminal of an LED string.

According to the present aspect, the LED driving circuit may implement a pulse width modulation (PWM) driving waveform by counting external or internal clocks through a digital counter circuit and may achieve the flicker-free effect by driving LEDs at a high PWM frequency without being limited by a display frame rate.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
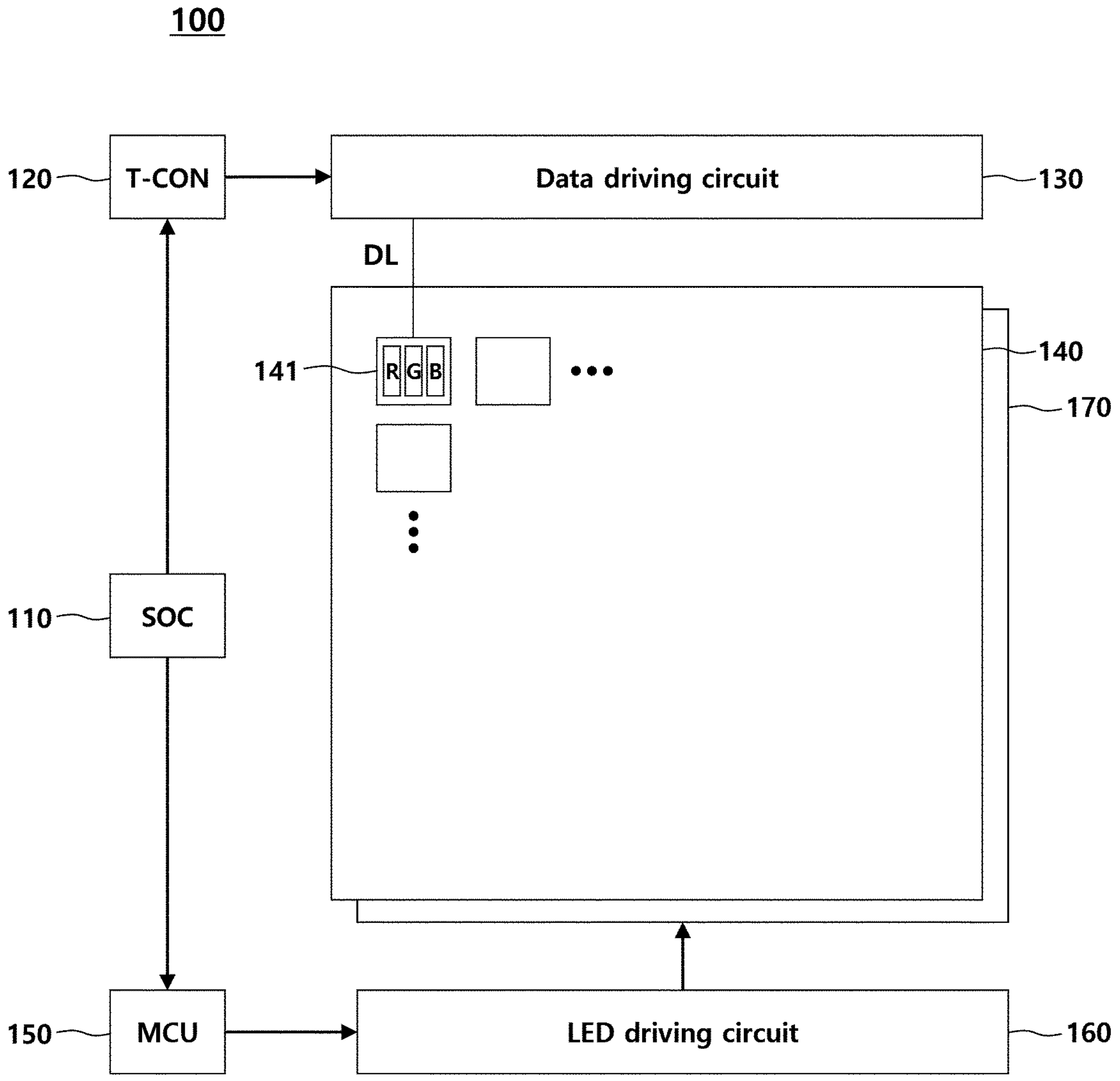
FIG. 1 is a block diagram of a display device according to the present aspect.

FIG. 1 is a block diagram of a display device according to the present aspect.

Referring to FIG. 1, the display device 100 may include a system-on-chip (SOC) 110, a timing controller (T-CON) 120, a data driving circuit 130, and a display panel 140, a microcontroller unit (MCU) 150, an LED driving circuit 160, a backlight 170, and the like.

The system-on-chip (SOC) 110 may be a circuit that performs a function of a central processing unit (CPU), such as an application processor (AP) of a mobile device, and additionally may be a semiconductor chip for performing arithmetic operation and control operation for controlling the operation of an internal electronic circuit of the display device. The system-on-chip 110 may control the timing controller 120, the microcontroller unit 150, and the like or transmit a signal to each circuit to define an internal operation.

The timing controller (T-CON) 120 may be a circuit that controls operation timing of the data driving circuit 130, the LED driving circuit 160, and the like or performs digital operations. Further, the timing controller 120 may control the data driving circuit 130 to convert image data received from the outside to generate a data voltage corresponding to a grayscale value of pixels of the display panel 140.

The data driving circuit 130 may control the operation of a pixel 141 through a data line DL by changing the size and waveform of a data voltage in response to a control signal transmitted from the timing controller 120. For example, the data driving circuit 130 may control the operation of a polarizer provided in the pixel 141.

The display panel 140 may be an organic light emitting diode (OLED) panel, a liquid crystal display (LCD), or the like, but may have a structure in which light may be transmitted by the backlight 170. Mini-LED is a miniaturized LED included in an LCD backlight to reduce the disadvantages of conventional LCDs and requires a chip smaller than an LED driving circuit for conventional LCD operation, and thus a large number of chips may be used.

One pixel (P) of the panel 140 includes red (R), green (G), and blue (B) subpixels and may determine or change the wavelength of light transmitted through a color filter (not shown).

The microcontroller unit (MCU) 150 may be a device for controlling the driving timing, driving current, driving voltage, and the like of LEDs by transmitting a control signal to the LED driving circuit 160. The timing controller 120 and the microcontroller unit 150 may share some functions and, if necessary, may be integrated for effective data operation, but they are not limited thereto.

The LED driving circuit 160 may be a device for controlling operations of a plurality of LEDs disposed in the backlight. The LED driving circuit 160 may control the operation of an internal current source or channel control circuit (not shown) and may control the timing or intensity of a driving current transmitted to the LEDs. The LED driving circuit 160 may change the operations of the LEDs based on a control signal received from the microcontroller unit 150 or change the operations of the LEDs based on a signal received from another LED driving circuit. If necessary, the LED driving circuit 160 may change the operations of the LEDs based on an algorithm or information stored in advance by an internal register (not shown).

The backlight 170 may have a configuration in which a plurality of LEDs is disposed on a substrate and may be formed integrally with the display panel 140 or formed separately therefrom as necessary. The LEDs disposed in the backlight 170 may be individually controlled for each LED channel defined by an LED string according to the LED driving circuit 160.

In the description, the term "light emitting diode" is used interchangeably with LED and the meaning there of may be the same as that of the LED.

Figure 2:
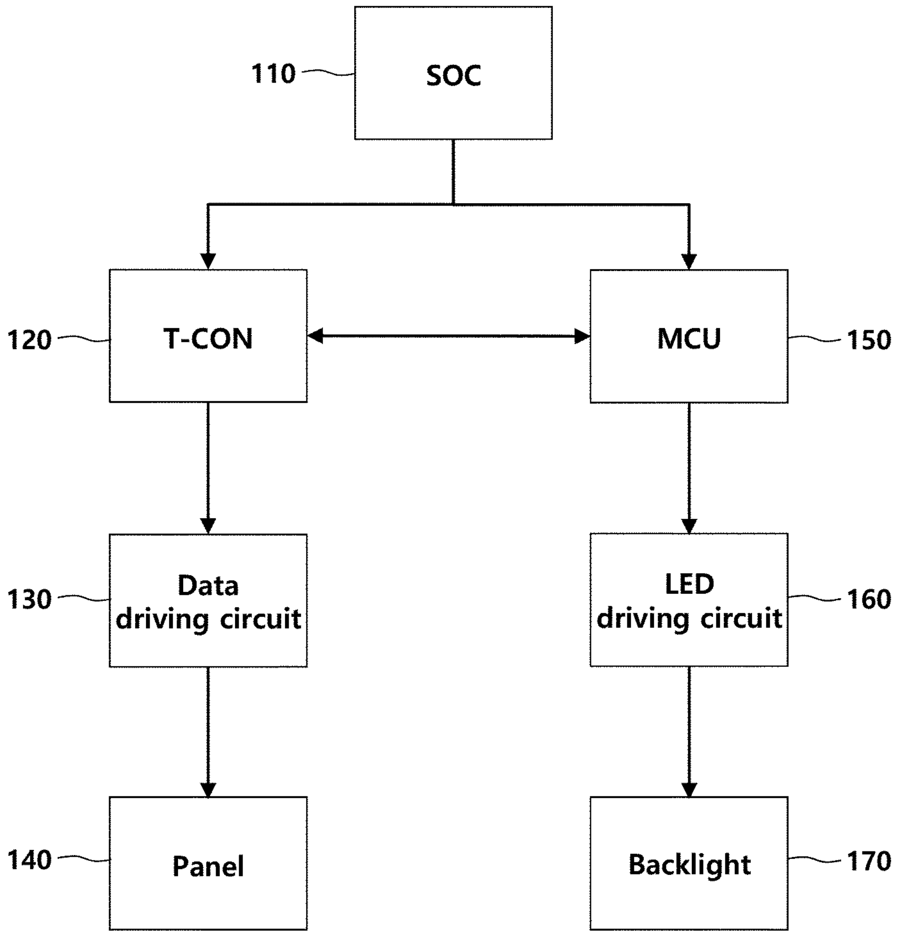
FIG. 2 is a diagram for describing a method of driving the display device according to the present aspect.

FIG. 2 is a diagram for describing a method of driving the display device according to the present aspect.

Referring to FIG. 2, the system-on-chip (SOC) 110 may control operation of the display panel 140 or operation of the LEDs by the timing controller 120 or the microcontroller unit 150.

The timing controller 120 may determine operation timings of a gate driving circuit (not shown), the data driving circuit 130, and the LED driving circuit 160, and the operation timing of each circuit may be defined to correspond to a synchronization signal SYNC or all or some rising edges or falling edges of a serial clock signal SCLK.

The timing controller 120 may control the operation of the pixel P by a gate control signal GCS transmitted to the gate driving circuit (not shown) and a data control signal DCS transmitted to the data driving circuit 130. The operation of a polarizer of liquid crystal may be changed in response to voltage change in transistors disposed in the display panel 140, and thus a ratio of transmitted light may be appropriately controlled.

The microcontroller unit 150 may change the state of the driving voltage or driving current transmitted to the LEDs by an LED control signal LCS transmitted to the LED driving circuit 160.

The timing controller 120 and the microcontroller unit 150 may be integrated, and if required, may be defined as functionally separated individual circuit configurations.

Figure 3:
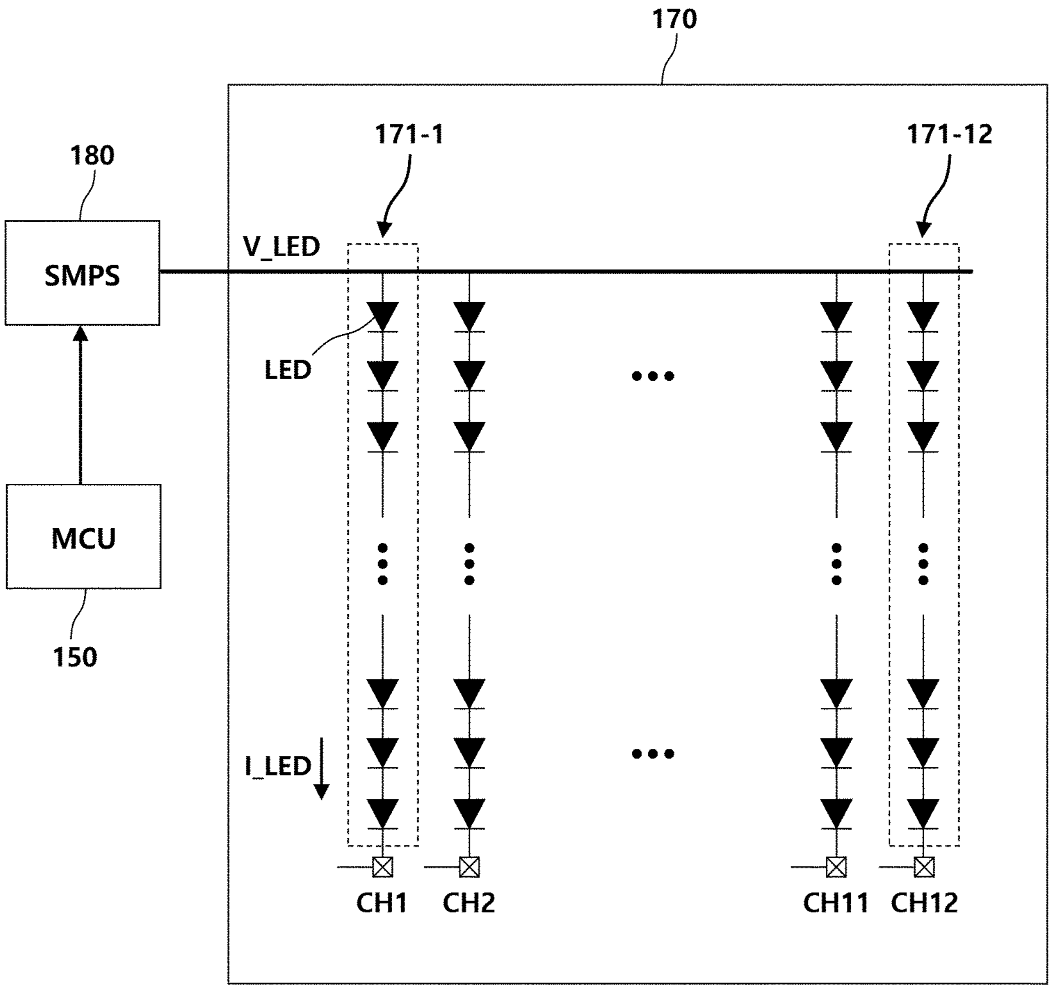
FIG. 3 is a diagram illustrating a method of supplying power to each channel of light emitting diodes according to the present aspect.

FIG. 3 is a diagram illustrating a method of supplying power to each channel of LEDs according to the present aspect.

Referring to FIG. 3, the backlight 170 may receive a driving voltage V_LED through one end of each LED string from a switching mode power supply (SMPS) 180 and allow a driving current I_LED to flow through current channels CH1 to CH12 to determine the brightness of the LEDs.

The switching mode power supply 180 may supply the same driving voltage V_LED or different driving voltages V_LED1 to V_LED12 to a first LED group 171-1 to a twelfth LED group 171-12, and the LED driving circuit (not shown) may control the driving current I_LED flowing through each LED string by adjusting the voltage of the other end of each channel. LEDs of each LED string may display an image with a desired brightness by radiating light to the display panel in response to the driving current I_LED.

The switching mode power supply 180 may adjust the level of the driving voltage V_LED of the LED strings by a boost converter and determine the timing and intensity of the driving voltage V_LED of the LED strings according to a control signal transmitted from the microcontroller unit 150.

Although the same driving current I_LED may flow through the channels, different driving currents I_LED1 to I_LED12 may flow therethrough.

The microcontroller unit 150 may adjust the timing and level of the LED driving voltage V_LED supplied by the switching mode power supply 180.

The number and shape of LEDs and channels formed in the backlight 170 of FIG. 3 are for illustrating the driving voltage and driving current of LEDs, and the backlight may include various numbers and types of LEDs.

Figure 4:
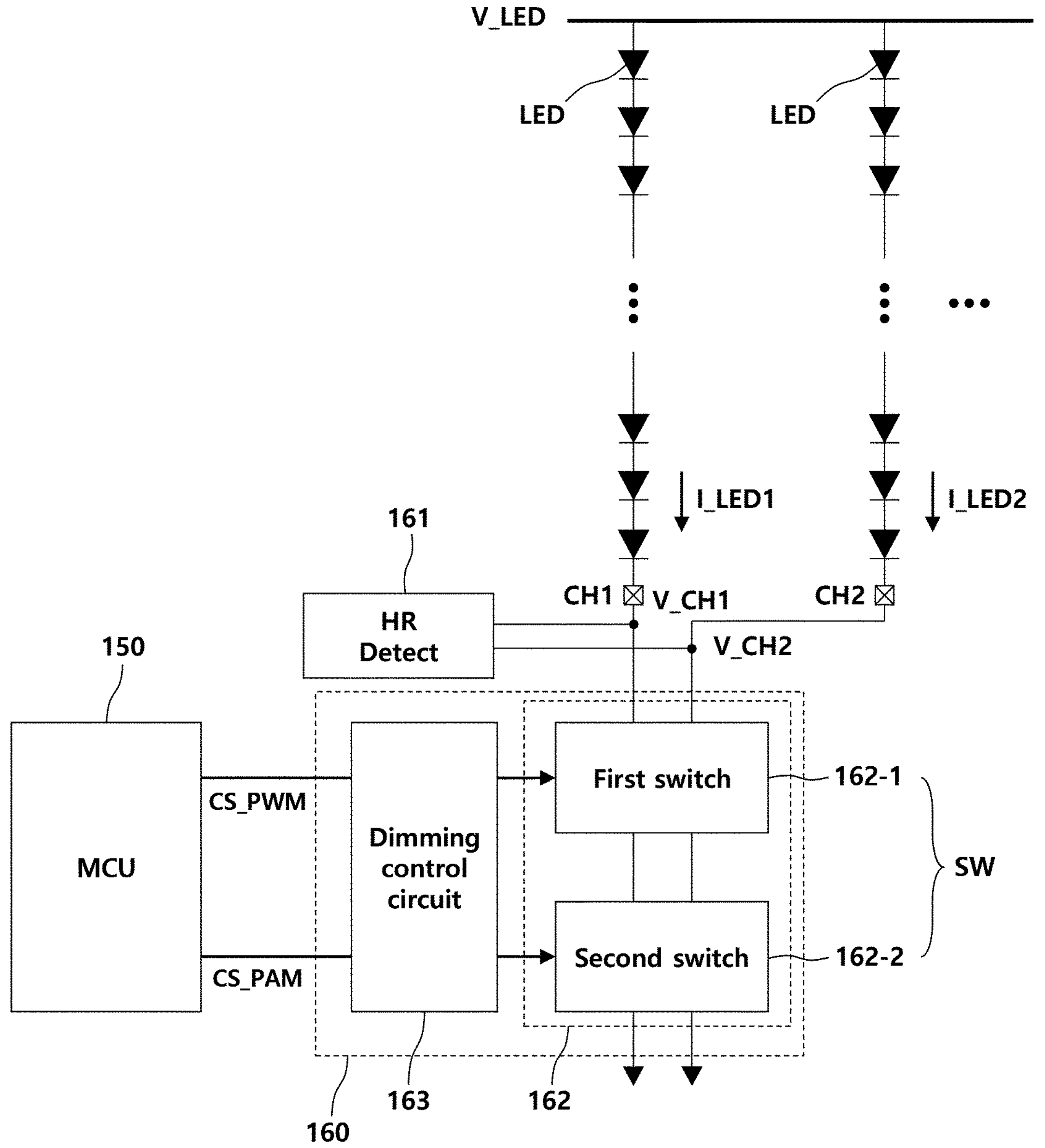
FIG. 4 is a diagram for describing a switch operation of an LED driving circuit according to the present aspect.

FIG. 4 is a diagram for describing a switch operation of the LED driving circuit according to the present aspect.

Referring to FIG. 4, the LED driving circuit 160 may receive an LED driving control signal CS_LED, for example, a PWM driving control signal CS_PWM and a PAM driving control signal CS_PAM, transmitted by the microcontroller unit 150 and adjust the timing or intensity of the driving current of the LEDs to control the brightness of light transmitted to the display panel. The LED driving circuit 160 may adjust the brightness of the LEDs by controlling the timing or intensity of a voltage applied to one or both ends of a channel.

The LED driving control signal CS_LED may define the operation timing of the internal circuit of the LED driving circuit 160 and may individually control the driving current I_LED of the LEDs which flows through channels CH1, CH2, and the like by changing the states of the internal transistors of the LED driving circuit 160.

For example, the LED driving control signal CS_LED may control turn-on and turn-off of switches disposed in the LED driving circuit 160 or control the intensity or direction of a current flowing through transistors.

Referring to FIG. 4, the LED driving circuit 160 may further include a channel control circuit 162, and the channel control circuit 162 may further include a first switch circuit 162-1 and a second switch circuit 162-2.

The LED driving circuit 160 may be electrically connected to LEDs and may include one or more current channels CH for transferring the driving current of the LEDs. For example, the first driving current I_LED1 may be individually generated and controlled through the first channel CH1 and the second driving current I_LED2 may be individually generated and controlled through the second channel CH2.

The current channel CH may be connected in series with the LEDs, the first switch circuit 162-1, and the second switch circuit 162-2. The output voltage V_CH or the driving current I_LED of the LEDs may be changed by the operations of the first and second switch circuits 162-1 and 162-2.

The dimming control circuit 163 may receive the PWM driving control signal CS_PWM or the PAM driving control signal CS_PAM from the microcontroller unit 150 and define operation timings and operation states of the first switch circuit 162-1 and the second switch circuit 162-2. The current channel CH may include a plurality of channels, and the dimming control circuit 163 may individually control the LED driving currents I_LED1 and I_LED2 of the plurality of channels or output voltages V_CH1 and V_CH2 of LED strings in response to the PWM driving control signal or the PAM driving control signal.

The dimming control circuit 163 may set an operation period of the first switch circuit 162-1 and an operation period of the second switch circuit 162-2 based on driving current values of the LEDs or an output current value of a digital-to-analog converter DAC.

The first switch circuit 162-1 may adjust the level of the driving current of the LEDs according to the duty ratio of the PWM driving control signal. For example, as the duty ratio of the PWM driving control signal decreases, the time period of the current passing through the first switch circuit 162-1 decreases, thereby reducing the driving current I_LED of the LEDs. The driving current I_LED of the LEDs may increase or decrease at certain intervals according to a turn-on timing and a turn-off timing of the first switch circuit 162-1, and the average intensity of the driving current of the LEDs may be defined by averaging the increasing/decreasing driving currents.

The second switch circuit 162-2 may receive the pulse amplitude modulation (PAM) driving control signal to adjust the level of the driving current of the LEDs. The second switch circuit 165 may receive the PAM driving control signal having an analog signal waveform or a code value having a digital signal waveform.

The LED driving circuit 160 may individually adjust the PWM driving control signal and the PAM driving control signal transmitted to the plurality of current channels and receive PWM control data for controlling the PWM driving control signal and PAM control data for controlling the PAM driving control signal in the same time period. In this case, the communication protocol may be simplified by simultaneously receiving the PWM control data and the PAM control data.

The microcontroller unit 150 may determine a PWM driving timing and a PAM driving timing by time-dividing an LED driving control signal of N-bit (N being a natural number equal to or greater than 2) code. The LED driving control signal may be a control signal for selecting one of a PWM driving mode in which PWM driving is performed alone, a PAM driving mode in which PAM driving is performed alone, and a hybrid driving mode in which PWM driving and PAM driving are mixed.

The LED driving circuit 160 may monitor the output voltages V_CH1 and V_CH2 or the LED currents I_LED1 and I_LED2 of the LED strings detected by a headroom detection circuit 161 in real time or periodically and transmit the output voltages V_CH1 and V_CH2 or the LED currents I_LED1 and I_LED2 to the microcontroller unit 150 or transmit the same to a digital logic operation circuit (not shown) provided in the LED driving circuit 160 for operation of the LED driving circuit 160.

The LED driving circuit 160 may include a plurality of integrated circuits electrically connected to the plurality of current channels, and the plurality of integrated circuits may be connected in a serial structure and perform serial peripheral interface (SPI) communication such that the driving modes may be sequentially updated. Driving modes of the plurality of integrated circuits or the plurality of current channels may be individually defined, and the driving modes may be changed according to one frame or some frames.

The LED driving circuit 160 may include a plurality of current channels, and the LED driving control signal may individually adjust driving currents of the current channels to transmit a current deviation compensation signal.

Figure 5:
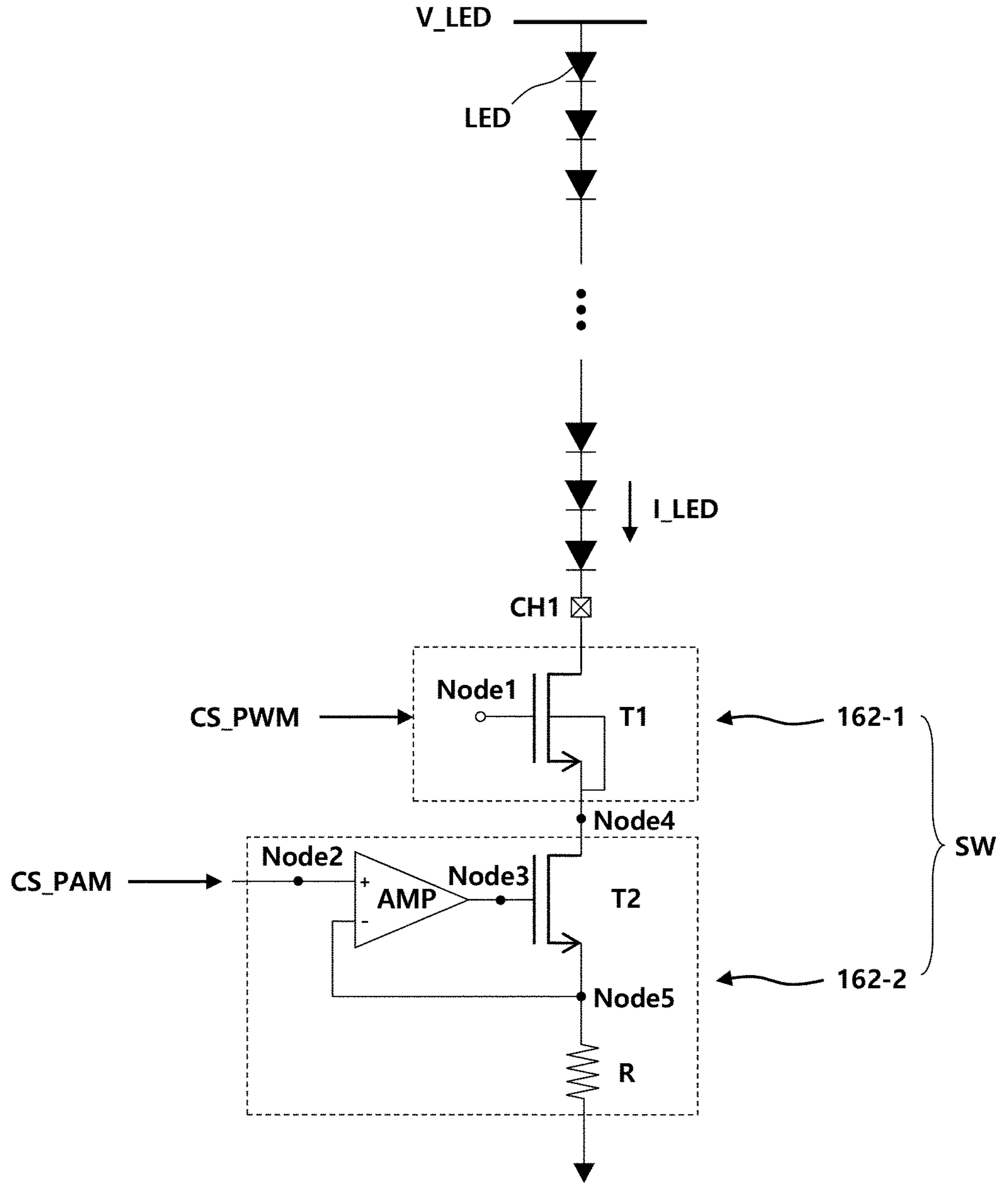
FIG. 5 is a configuration diagram of a switch circuit according to the present aspect.

FIG. 5 is a configuration diagram of a switch circuit according to the present aspect.

Referring to FIG. 5, the channel control circuit 162 may include the first switch circuit 162-1 and the second switch circuit 162-2.

The first switch circuit 162-1 may include a field effect transistor T1 having one terminal electrically connected to a current channel, and the transistor T1 may receive the PWM driving control signal CS_PWM through the gate terminal thereof. One terminal of the transistor T1 may be connected to the current channel of an LED string and the other terminal may be connected to a transistor T2.

The first switch circuit 162-1 may change the state of the supply current I_LED of the LEDs by repeating a turn-on state or a turn-off state in response to the duty ratio of the PWM driving control signal.

The second switch circuit 162-2 may include an operational amplifier AMP that receives the PAM driving control signal through a first input terminal, for example, a positive input terminal, the field effect transistor T2 that receives the output signal of the operational amplifier through the gate terminal thereof, and a resistor R connected to the drain terminal of the transistor T2.

In addition, the operational amplifier of the second switch circuit 162-2 may receive the drain terminal voltage of the transistor T2 as a feedback voltage through a second input terminal, for example, a negative input terminal, and determine an output signal by comparing a voltage difference between the positive input terminal and the negative input terminal.

Figure 6:
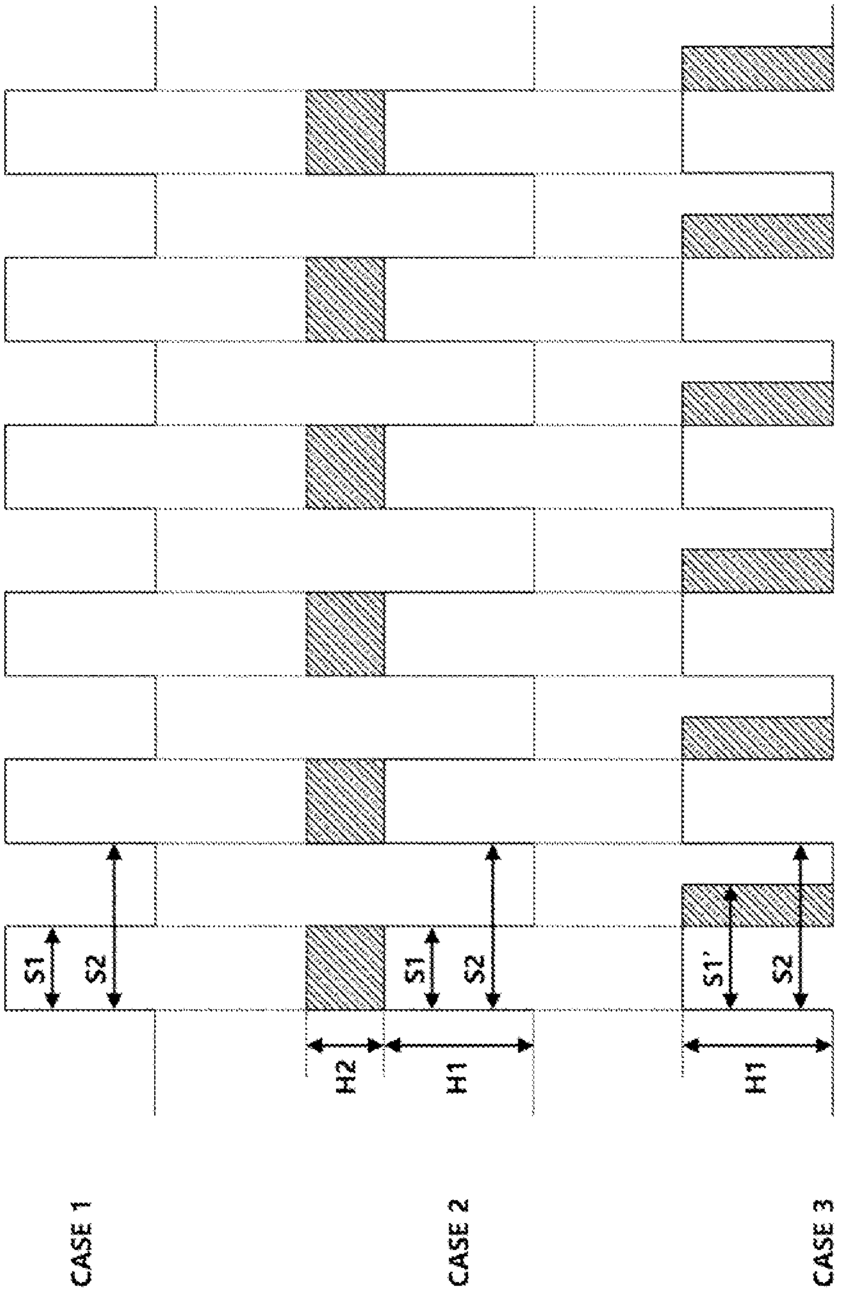
FIG. 6 is a diagram for describing a method of controlling an LED driving current according to the present aspect.

FIG. 6 is a diagram for describing a method of controlling the LED driving current according to the present aspect.

Referring to FIG. 6, according to a method of controlling the LED current of the LED driving circuit or the output voltage of an LED string, it is possible to define a ratio of a turn-on period S1 with respect to a constant period S2 as a duty ratio and generate the PWM driving control signal to turn on/off a current source, or adjust a time interval of a current passing through a transistor to change the LED current I_LED of an LED or the output voltage V_CH of the LED string, thereby controlling the brightness of the LED as in a first CASE 1.

As in a second case CASE 2, the intensity of the LED current may be increased by increasing the intensity of the current of the current source or the intensity of the current passing through the transistor from a first intensity H1 to a second intensity (H2). In this case, it is possible to increase the brightness of the LED by increasing the signal intensity while maintaining the same duty ratio as compared to the first case CASE 1.

In a third case CASE 3, the brightness of the LED may be changed by changing the duty ratio while maintaining the first intensity H1. The level of the LED current of the LED may be increased according to a changed turn-on state period S1'. By supplying current to the LED for a long time within one cycle, the brightness of the LED may be increased by increasing the average value of the LED currents formed in the LED.

The LED driving circuit may adopt the above-described method to adjust the output voltage V_CH of the LED string or the driving voltage V_LED of the LED string in addition to the LED current I_LED.

Figure 7:
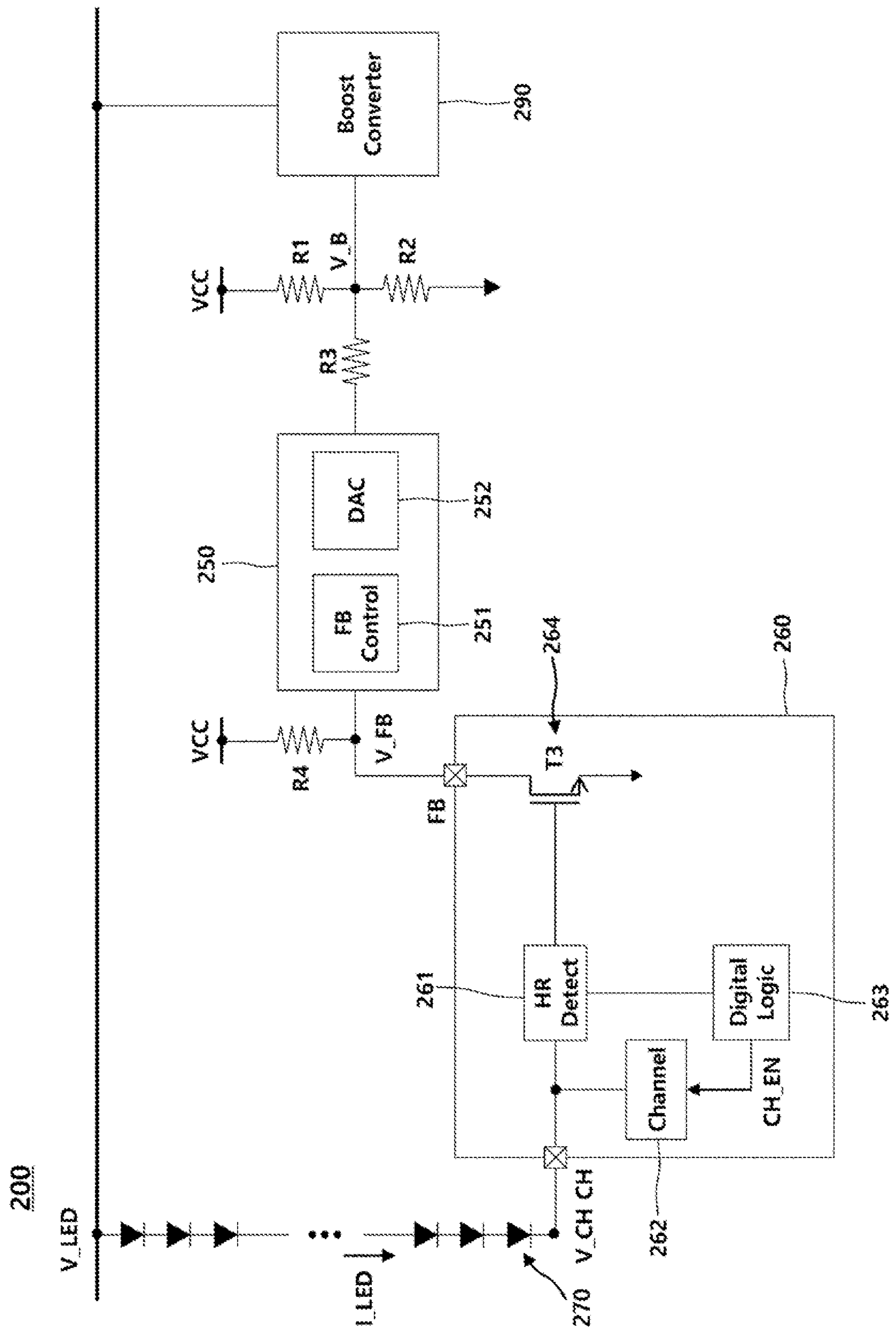
FIG. 7 is a first exemplary configuration diagram of an LED driving circuit according to the present aspect.

FIG. 7 is a first exemplary configuration diagram of an LED driving circuit according to the present aspect.

Referring to FIG. 7, a display device 200 may include a microcontroller unit 250, an LED driving circuit 260, an LED string 270, a boost converter 290, and the like.

The LED driving circuit 260 may include a headroom detection circuit 261, a channel control circuit 262, a digital logic circuit 263, a feedback transistor 264, and the like.

The headroom detection circuit 261 may detect and monitor the output voltage V_CH of the LED string formed at one end of the LED string 270. The LED string 270 may be defined as a set including one or more LEDs, the output voltage V_CH of the LED string is formed at the lower end of the LED string 270, the driving voltage V_LED of the LED string is formed at the upper end of the LED string 270, and an LED current I_LED may flow through the LEDs.

The headroom detection circuit 261 may monitor whether the output voltage V_CH of the LED string is equal to or less than a preset reference voltage V_REF and transmit the detected level value of the output voltage V_CH of the LED string or a deviation value corresponding to a difference between the reference voltage V_REF and the output voltage V_CH of the LED string to the microcontroller 250 or the like.

When the output voltage V_CH of the LED string is equal to or less than the preset reference voltage V_REF, the headroom detection circuit 261 may control the digital logic circuit 263 such that the digital logic circuit 263 transmits a channel enable signal CH_EN to the channel control circuit 262 to change, for example, increase, the output voltage V_CH of the LED string.

The headroom detection circuit 261 may transfer the output voltage V_CH of the LED string to one terminal, for example, the gate terminal, of the feedback transistor 264. The feedback transistor 264 may transfer information on the output voltage V_CH of the LED string measured by the headroom detection circuit 261 to the microcontroller unit 250 while electrically separating the LED driving circuit 260 from the microcontroller unit 250.

The channel control circuit 262 may be a circuit including a current source or a set of one or more transistors. The channel control circuit 262 may adjust the level and timing of the output voltage V_CH of the LED string formed at the channel terminal or adjust the level and timing of the LED current I_LED.

The channel control circuit 262 may control the output voltage V_CH or the level of the LED current I_LED of the LED string in response to the timing of the channel enable signal CH_EN generated and transmitted by the digital logic circuit 263. For example, the channel control circuit 262 may increase the output voltage V_CH of the LED string formed in the channel when the channel enable signal CH_EN is in a high state and decrease the output voltage V_CH of the LED string formed in the channel when the channel enable signal CH_EN is in a low state. In this case, voltage rising and falling timings may be the same, but there may be a certain time delay or deviation.

The channel control circuit 262 may include a switch circuit as shown in FIGS. 4 and 5. The channel control circuit 262 may include a first switch circuit for controlling a state such as the output voltage V_CH and the level of the LED current I_LED of the LED string according to the duty ratio of the PWM driving control signal generated by the digital logic circuit 263. In addition, the channel control circuit 262 may include a second switch circuit for receiving the PAM driving control signal generated by the digital logic circuit 263 and controlling a state such as the output voltage V_CH and the level of the LED current I_LED of the LED string.

The digital logic circuit 263 may generate and transmit the channel enable signal CH_EN for the LED string to control the output voltage V_CH of the LED string. The digital logic circuit 263 may control the output voltage V_CH of one end of the LED string 270 but may control a driving voltage V_LED of the other end of the LED string 270.

The digital logic circuit may control the operation of the channel control circuit by transferring the channel enable signal CH_EN in a high state to the channel control circuit to increase the output voltage V_CH of the LED string when the output voltage V_CH of the LED string is equal to or less than the preset reference voltage V_REF and transferring the channel enable signal CH_EN in a low state to the channel control circuit to decrease the output voltage V_CH of the LED string when the output voltage V_CH of the LED string exceeds the preset reference voltage V_REF. Although the output voltage V_CH of the LED string may correspond to timings of the high state and the low state of the channel enable signal CH_EN, rising and falling may occur through a predetermined time delay.

In addition, the digital logic circuit may control the operation of the channel control circuit by transferring the channel enable signal CH_EN in a high state to the channel control circuit to increase the driving current I_LED of the LED string when the output voltage V_CH of the LED string is equal to or less than the preset reference voltage V_REF and transferring the channel enable signal CH_EN in a low state to the channel control circuit to decrease the driving current I_LED the LED string when the output voltage V_CH of the LED string exceeds the preset reference voltage V_REF. Although the driving current I_LED of the LED string may correspond to timings of the high state and the low state of the channel enable signal CH_EN, rising and falling may occur through a predetermined time delay.

The output voltage V_CH of the LED string or the driving current I_LED of the LED string may be defined to correspond to the timing of the channel enable signal CH_EN.

The digital logic circuit 263 may count the number of clocks of a vertical synchronization signal VSYNC transmitted from the outside of the LED driving circuit 260 or count the number of clocks of a PWM clock signal generated by an internal oscillator.

For example, the digital logic circuit 263 may count the number of clocks transmitted during a predetermined time period or measure a time taken to count a preset number of clocks. The digital logic circuit 263 may generate a control signal for adjusting the output voltage V_CH of the LED string until criteria corresponding to preset operating conditions are satisfied, or generate a feedback signal for adjusting the driving voltage V_LED of the LED string signal.

The feedback transistor (T3) 264 may receive the voltage value of the output voltage V_CH of the LED string or a difference value between the reference voltage V_REF and the output voltage V_CH of the LED string transmitted to the gate terminal and change the intensity of current by a voltage formed at other terminals, for example, the source terminal and the drain terminal. For example, in the feedback transistor 264, current may flow only when the voltage value of the output voltage V_CH of the LED string is equal to or less than the voltage value of the reference voltage V_REF, and as the difference therebetween increases, the intensity of the current flowing through the feedback transistor 264 may increase.

The microcontroller unit 250 may receive information on the voltage formed at the first terminal, for example, the source or drain terminal, or the second terminal, for example, the drain or source terminal, of the feedback transistor 264 or information on the current flowing through the feedback transistor 264 and determine whether to adjust the driving voltage V_LED of the LED string 270. For example, the microcontroller unit 250 may be electrically connected to the feedback transistor 264, measure a terminal current flowing through one terminal of the feedback transistor 264, and generate a feedback control signal for adjusting the level of the driving voltage V_LED of the LED string.

The microcontroller unit 250 may further include a feedback control circuit 251, a digital-to-analog converter 252, and the like. The feedback control circuit 251 may obtain information on a terminal current or a terminal voltage of the feedback transistor 264, determine whether to feed back the driving voltage V_LED of the LED string, and generate a feedback control signal.

The microcontroller unit 250 may obtain information on rising or falling of the output voltage V_CH of the LED string through a current value flowing through one terminal, for example, a terminal connected to a feedback port of a communication chip, of the feedback transistor 264 and generate a feedback control signal for adjusting the level of the driving voltage V_LED of the LED string when the output voltage V_CH of the LED string is equal to or less than the reference voltage V_REF to control the output voltage, for example, LED voltage V_LED, of the boost converter.

The feedback control circuit 251 may appropriately control voltage increase in the booster converter 290 by changing a booster voltage V_B formed by the digital-to-analog converter 252 in consideration of a driving voltage VCC, a first resistor R1, a second resistor R2, and a third resistor R3.

The feedback control signal may be a control signal for operating the digital-to-analog converter 252 or a control signal for operating the booster converter 290. The feedback control signal may include a control value for controlling the driving voltage V_LED of the LED string or a code value corresponding thereto.

If the LED driving circuit 260 does not perform a feedback operation of monitoring the output voltage V_CH of the LED string by the headroom detection circuit 261 and feeding back the same to change the driving voltage V_LED of the LED string, or simply controls ON/OFF of the channel control circuit 262, current influences on other adjacent channels occur through repetition of rising and falling of the output voltage V_CH of the LED string, or change in display brightness cannot be appropriately controlled through flicking.

Figure 8:
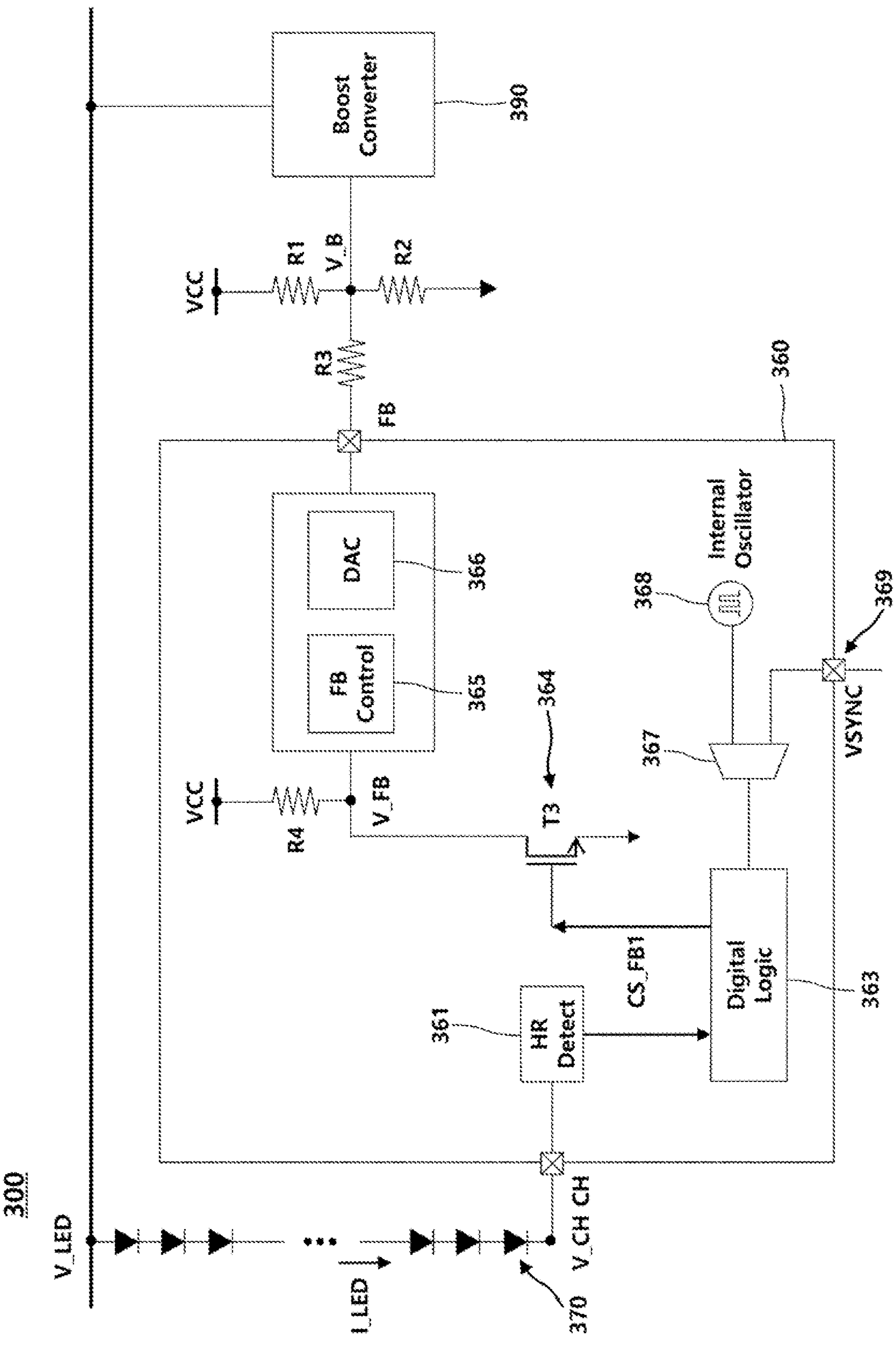
FIG. 8 is a second exemplary configuration diagram of an LED driving circuit according to the present aspect.

FIG. 8 is a second exemplary configuration diagram of an LED driving circuit according to the present aspect.

Referring to FIG. 8, a display device 300 may include an LED driving circuit 360, an LED string 370, a boost converter 390, and the like.

The LED driving circuit 360 may include a headroom detection circuit 361, a channel control circuit (not shown), a digital logic circuit 363, a feedback transistor 364, a feedback control circuit 365, a digital-to-analog converter 366, a multiplexer 367, an oscillator 368, a horizontal synchronization port 369, and the like.

The headroom detection circuit 361 may detect an output voltage V_CH or an LED current I_LED formed at one end of the LED string 370, for example, a current channel port of an LED driving chip. Here, the lowermost end of the LED string 370 or a point connected to a current channel CH may be defined as a headroom.

The headroom detection circuit 361 may repeatedly measure the output voltage V_CH or the LED current I_LED of the LED string for a preset time and compare the same with a reference voltage V_REF. Here, the preset time may be changed by a microcontroller unit (not shown) or internal operation control.

The digital logic circuit 363 may transmit a feedback signal CS_FB1 to the feedback transistor 364 without directly performing ON-OFF control of the channel through the channel control circuit (not shown).

When the headroom detection circuit 361 determines that the output voltage V_CH of the LED string is equal to or less than the preset reference voltage V_REF, the digital logic circuit 363 may count clocks of an external vertical synchronization signal VSYNC or an internal PWM clock signal to determine a feedback timing.

In this case, the feedback timing may be a timing at which the digital logic circuit 363 counts the number of clocks by a preset counting number or a timing reset and updated for each frame.

The digital logic circuit 363 may count rising edge or falling edge of the vertical synchronization signal VSYNC for each frame or count the number of clocks of the PWM clock signal generated by the internal oscillator 368.

The digital logic circuit 363 may be based on an arbitrary fixed value such as 16 or 32 as the number of counting clocks but may adjust the counting number after every frame or a set feedback timing has elapsed. For example, the digital logic circuit 363 may adjust the number of clocks counted in proportion to the absolute value of a difference between the reference voltage V_REF obtained from the headroom detection circuit 361 and the output voltage V_CH of the LED string and may increase the amount of change in the voltage of the boost converter 390 in proportion to the number of counted clocks, but is not limited thereto.

The feedback transistor 364 may receive the output signal CS_FB1 of the digital logic circuit 363 through the gate terminal thereof.

The feedback control circuit 365 is connected to a first terminal of the feedback transistor 364 and may determine whether to adjust the driving voltage V_LED of the LED string based on the current value flowing through the first terminal or a voltage value V_FB of the first terminal.

The digital-to-analog converter 366 may adjust the output signal based on the driving voltage control signal of the LED string transmitted by the feedback control circuit 365. For example, the digital-to-analog converter 366 may receive different digital code values for determining an output analog signal from the feedback control circuit 365.

The boost converter 390 may adjust the level of the driving voltage V_LED of the LED string according to a booster voltage V_B determined according to the output signal of the digital-to-analog converter. The boost converter 390 may be a type of DC-DC converter.

The multiplexer 367 may receive a PWM clock signal generated by the oscillator 368 in the LED driving circuit 360 and an external horizontal synchronization signal VSYNC transmitted from the horizontal synchronization port 369, select one of the two signals, and output the selected signal to the digital logic circuit 363. According to this configuration, the LED driving circuit 360 may transmit a feedback signal CS_FB1 according to pull-down by the operation of the digital logic circuit 363 to the internal circuits 364, 365, 366, and 390 to control operations thereof.

The digital logic circuit 363 may count rising edges or falling edges of the vertical synchronization signal VSYNC for every frame or every preset frame.

In addition, the digital logic circuit 363 may count the number of clocks of the PWM clock signal generated by the internal oscillator 368.

The digital logic circuit 363 may adjust the number of times of counting clocks based on the output voltage V_CH of the LED string of the headroom detection circuit 361. In this case, by internally adjusting the counting method of the digital logic circuit 363 through digital operation without adjusting the output voltage of the LED string formed in the channel, it is possible to improve the noise phenomenon occurring in the channel and improve flickering of the display device.

That is, the digital logic circuit 363 may generate the feedback signal CS_FB1 using an internal counter instead of generating a feedback signal through the output voltage V_CH or the LED current I_LED of the LED string. The digital logic circuit 363 may transmit a signal for feeding back increase in the driving voltage V_LED of the LED string to the feedback transistor 364 during a clock counting period.

The feedback control circuit 365 may determine the operation time of the digital-to-analog converter based on the counting number of the digital logic circuit 363.

The boost converter 390 may increase the driving voltage V_LED of the LED string in stages in response to a time period of an LED string driving voltage control signal generated by the feedback control circuit 365.

The configurations of the respective circuits described in FIG. 8 may be understood as being physically separated or functionally separated in one integrated circuit. For example, the booster converter 390 may have a circuit configuration separate from the LED driving circuit 360 but may have a circuit configuration integrated into the LED driving circuit 360.

Figure 9:
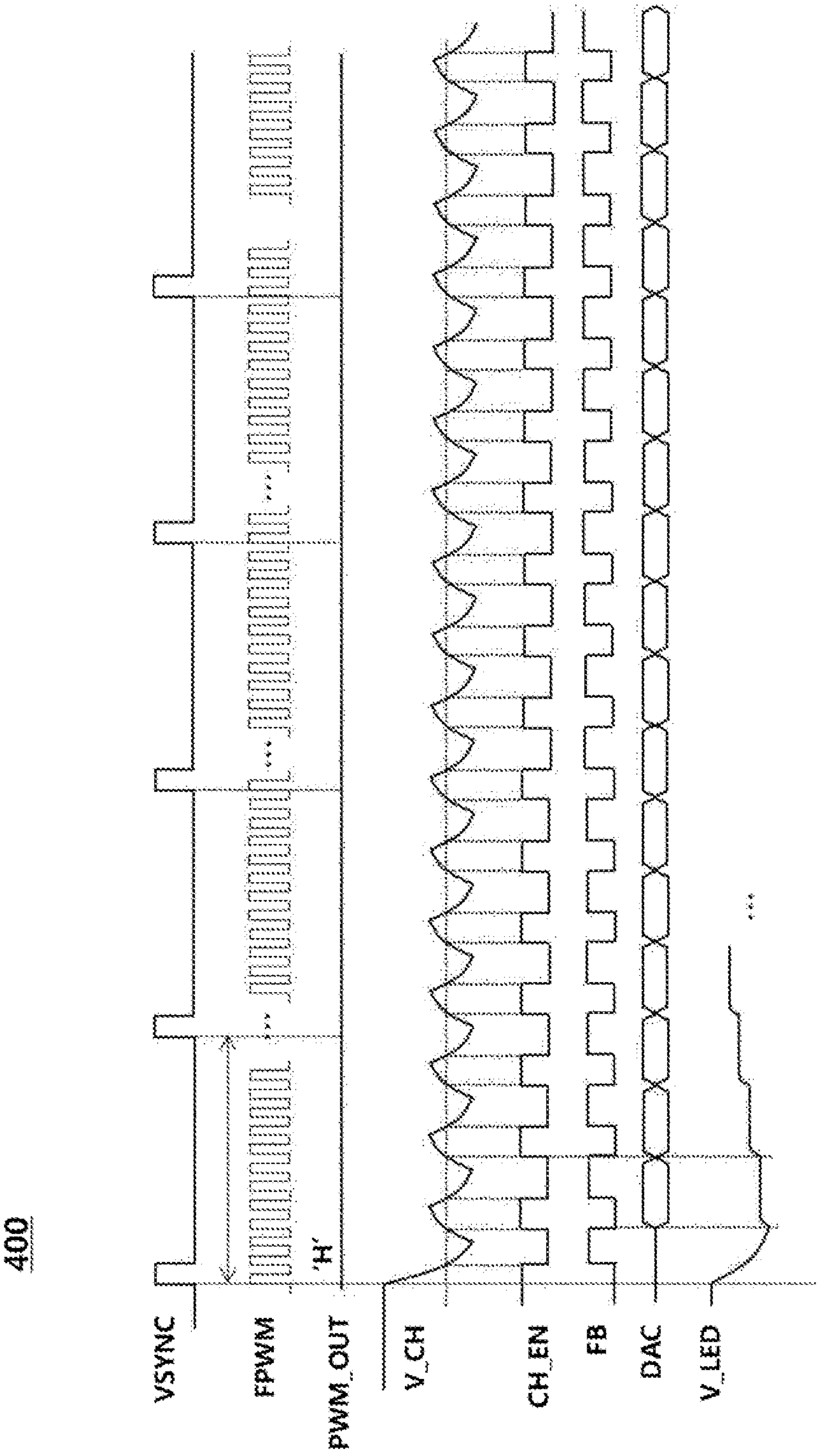
FIG. 9 is a first exemplary timing diagram of signals processed by the LED driving circuit according to the present aspect.

FIG. 9 is a first exemplary timing diagram of signals processed by the LED driving circuit according to the present aspect.

Referring to FIG. 9, timings indicating changes in the horizontal synchronization signal VSYNC of the LED driving circuit 200, the PWM clock signal FPWM, the output voltage V_CH of the LED string, the channel enabling signal CH_EN, the feedback signal FB, the LED control signal (input signal of the DAC), and the driving voltage V_LED of the LED string with time may be compared.

The output voltage V_CH of the LED string of the channel detected by the headroom detection circuit 261 may repeat rising and falling over time, which may correspond to the timing of the channel enabling signal CH_EN.

The LED control signal (input signal of the DAC) may be output in response to the timing of the feedback signal FB formed at one end of the feedback transistor, and accordingly, the driving voltage V_LED of the LED string may change.

Figure 10:
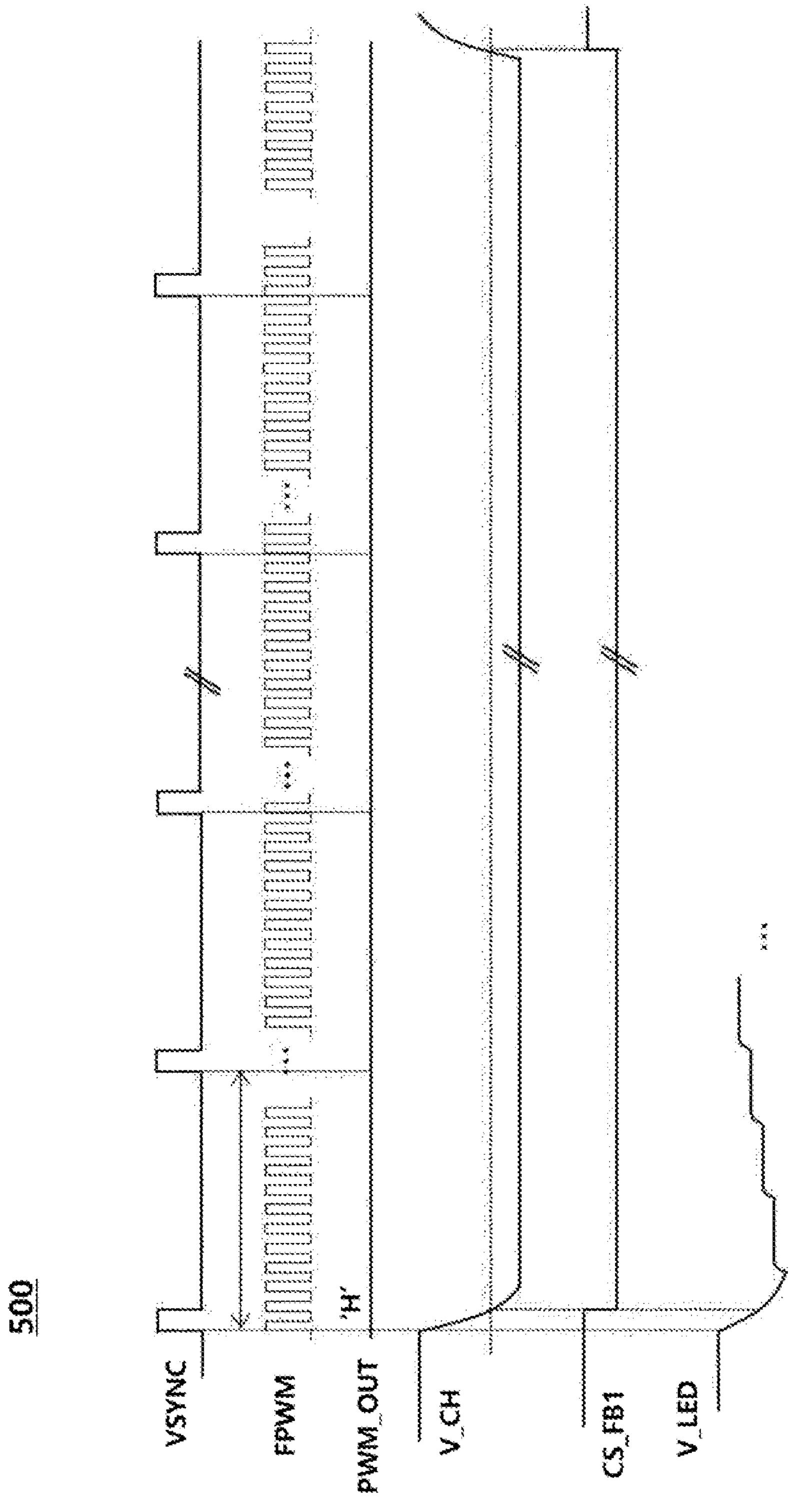
FIG. 10 is a second exemplary timing diagram of signals processed by the LED driving circuit according to the present aspect.

FIG. 10 is a second exemplary timing diagram of signals processed by the LED driving circuit according to the present aspect.

Referring to FIG. 10, timings indicating changes in the horizontal synchronization signal VSYNC of the LED driving circuit 360, the PWM clock signal FPWM, the output voltage V_CH of the LED string, the feedback signal CS_FB1, and the driving voltage V_LED of the LED string with time may be compared.

The headroom detection circuit 361 may monitor the output voltage V_CH of the LED string, and the digital logic circuit 363 may count the external horizontal synchronization signal V_SYNC or the internal PWM clock signal FPWM to continuously maintain a low state of the feedback signal CS_FB1. In this case, the feedback control circuit 365 may continuously transmit the LED string driving voltage control signal for voltage increase, and the boost converter 390 may continue to control increase of the driving voltage V_LED of the LED string.

The digital logic circuit 363 may terminate counting of the external horizontal synchronization signal V_SYNC or the internal PWM clock signal FPWM according to counting termination or reset and change the low state of the feedback signal CS_FB1 to a high state.

The digital logic circuit 363 may perform a counting operation of adjusting the number of counting clocks for a time set by the digital logic circuit 363 based on a difference between the reference voltage V_REF and the output voltage V_CH of the LED string or a difference between the reference current I_REF and the LED current I_LED or varying the number of counting clocks according to a counting time that satisfies a reference counting number.

In this manner, it is possible to reduce noise that may affect adjacent channels by monitoring the output voltage V_CH of the LED string and creating a feedback signal CS_FB1 for a set time. Flicker-free effect may be achieved by implementing PWM driving through a counting circuit by counting external or internal clocks and performing driving at a high PWM frequency without being limited by a display frame rate.

Figure 11:
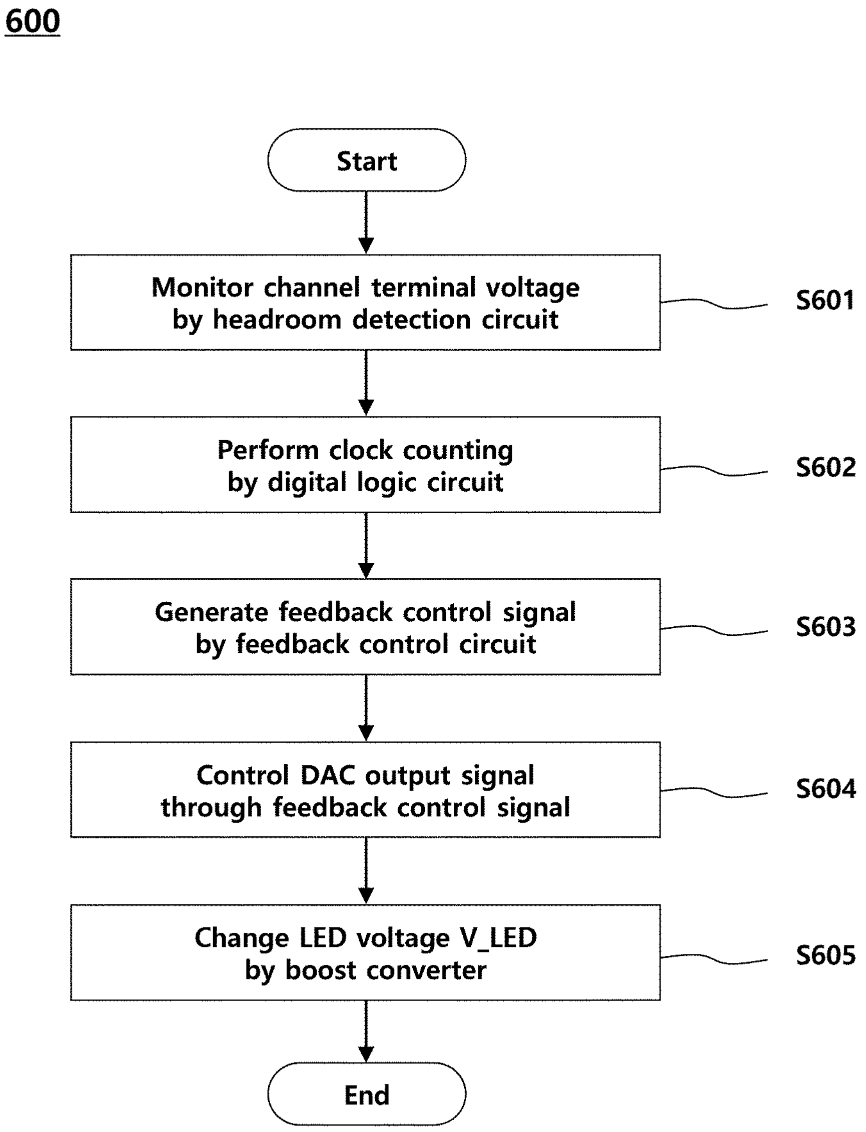
FIG. 11 is a flowchart of an LED driving method according to the present aspect.

FIG. 11 is a flow chart of an LED driving method according to the present aspect.

Referring to FIG. 11, the LED driving method 600 may include a step S601 of monitoring an output voltage of an LED string, a step S602 of performing clock counting, a step S603 of generating a feedback control signal, a step S604 of controlling an output signal of a digital-to-analog converter, and a step S605 of changing the driving voltage of the LED string.

The step S601 of monitoring the output voltage of the LED string may be a step of monitoring the output voltage V_CH of the LED string and determining whether the output voltage V_CH is equal to or less than a reference voltage V_REF. Such an operation may be performed in a headroom detection circuit or the like and may be monitoring an LED current I_LED in addition to the output voltage V_CH of the LED string.

The step S602 of performing clock counting may be a step of counting clocks of an external vertical synchronization signal VSYNC or an internal PWM clock signal to determine a feedback timing when the output voltage V_CH of the LED string is equal to or less than the reference voltage V_REF. Such an operation may be performed in a digital logic circuit, and the waveform and pulse width of a signal transmitted to a feedback transistor may vary depending on the number of rising edges or falling edges of the vertical synchronization signal or the PWM clock signal transmitted by a multiplexer.

In addition, the digital logic circuit may perform the clock counting operation when the output voltage V_CH of the LED string is equal to or less than the reference voltage V_REF and stop the clock counting operation when the output voltage V_CH of the LED string exceeds the reference voltage V_REF.

The external vertical synchronization signal VSYNC or the internal PWM clock signal may be transmitted to the multiplexer, and only one signal selected from the vertical synchronization signal and the PWM clock signal may be transmitted to the digital logic circuit.

The step S603 of generating the feedback control signal may be a step of changing a code value transmitted to the digital-to-analog converter according to the number and timing of clocks obtained from the feedback transistor.

The step S604 of controlling the output signal of the digital-to-analog converter may be a step of changing an analog signal output according to the feedback control signal. Accordingly, a booster voltage V_B formed in a signal line connected to a booster converter is changed, and thus the driving voltage V_LED of the LED string may be changed.

The step S605 of changing the driving voltage of the LED string may be a step in which the driving voltage V_LED of the LED string is boosted by the boost converter. A booting operation time of the boost converter may be determined according to a counting criterion that varies according to the state of the output voltage V_CH of the LED string.

If necessary, a circuit for voltage enhancement other than the boost converter may be used.

FIG. 11 is an example of the LED control method described above, the order of some steps may be changed or omitted, and a target of the circuit that performs the above-described operation may be defined differently.

It will be apparent to those skilled in the art that various modifications and variations can be made in the light emitting diode driving circuit and the driving method of the same in the present disclosure without departing from the spirit or scope of the aspects. Thus, it is intended that the present disclosure covers the modifications and variations of the aspects provided they come within the scope of the appended claims and their equivalents.

What is claimed is:

1. A light emitting diode (LED) driving circuit comprising:

a headroom detection circuit for detecting an output voltage V_CH of an LED string;

a digital logic circuit for generating a channel enable signal CH_EN of the LED string to control the output voltage V_CH of the LED string;

a channel control circuit for controlling the level of the output voltage V_CH of the LED string in response to the timing of the channel enable signal CH_EN of the digital logic circuit; and a feedback transistor for receiving the output voltage of the LED string detected by the headroom detection circuit, wherein the feedback transistor is electrically connected to a microcontroller unit to adjust the driving voltage V_LED of the LED string, and the microcontroller unit measures a current flowing through the feedback transistor and generates a feedback control signal for adjusting the level of the driving voltage V_LED of the LED string to control an operation of a boost converter.

2. The LED driving circuit of claim 1, wherein the headroom detection circuit monitors whether the output voltage V_CH of the LED string is equal to or less than a preset reference voltage V_REF.

3. The LED driving circuit of claim 2, wherein the digital logic circuit controls the operation of the channel control circuit by transmitting the channel enable signal CH_EN in a high state to the channel control circuit when the output voltage V_CH of the LED string is equal to or less than the preset reference voltage V_REF to increase the output voltage V_CH of the LED string and transmitting the channel enable signal CH_EN in a low state to the channel control circuit when the output voltage V_CH of the LED string exceeds the preset reference voltage V_REF to decrease the output voltage V_CH of the LED string.

4. The LED driving circuit of claim 1, wherein the digital logic circuit counts clocks of an external vertical synchronization signal VSYNC or counts clocks of a PWM clock signal generated by an internal oscillator.

5. The LED driving circuit of claim 1, wherein the channel control circuit includes:

a first switch circuit for adjusting the level of the output voltage V_CH of the LED string according to a duty ratio of a pulse width modulation (PWM) driving control signal generated by the digital logic circuit; and a second switch circuit for receiving a pulse amplitude modulation (PAM) driving control signal generated by the digital logic circuit and adjusting the level of the output voltage V_CH of the LED string.

6. The LED driving circuit of claim 1, wherein the microcontroller unit obtains information on rising or falling of the output voltage V_CH of the LED string through a current value flowing through the feedback transistor and generates the feedback control signal for adjusting the level of the output voltage V_CH of the LED string to control an output voltage of the booster converter when the output voltage V_CH of the LED string is equal to or less than the reference voltage V_REF.

7. A light emitting diode (LED) driving circuit comprising:

a headroom detection circuit for detecting an output voltage V_CH of an LED string formed at one end of the LED string;

a digital logic circuit for counting clocks of an external vertical synchronization signal VSYNC or an internal PWM clock signal to determine a feedback timing when the headroom detection circuit determines that the output voltage V_CH of the LED string is equal to or less than a preset reference voltage V_REF;

a feedback transistor for receiving an output signal of the digital logic circuit; and a feedback control circuit connected to a first terminal of the feedback transistor and determining whether to adjust the driving voltage V_LED of the LED string based on a current value flowing through the first terminal.

8. The LED driving circuit of claim 7, further comprising:

a digital-to-analog converter for adjusting an output signal based on an LED string driving voltage control signal transmitted by the feedback control circuit; and a boost converter for adjusting the level of the driving voltage V_LED of the LED string according to the output signal of the digital-to-analog converter.

9. The LED driving circuit of claim 7, wherein the headroom detection circuit repeatedly measures the output voltage V_CH of the LED string for a preset time and compares the output voltage V_CH with the reference voltage V_REF.

10. The LED driving circuit of claim 7, wherein the digital logic circuit counts rising edges or falling edges of the vertical synchronization signal VSYNC for every frame, or the digital logic circuit counts the number of clocks of a PWM clock signal generated by an internal oscillator and adjusts the number of times of counting clocks based on the output voltage V_CH of the LED string of the headroom detection circuit.

11. The LED driving circuit of claim 7, further comprising a multiplexer for selecting the external vertical synchronization signal VSYNC or the internal PWM clock signal and outputs the selected signal to the digital logic circuit.

12. The LED driving circuit of claim 7, wherein the digital logic circuit transmits, to the feedback transistor, a signal for feeding back increase in the driving voltage V_LED of the LED string during a clock counting period.

13. The LED driving circuit of claim 8, wherein the feedback control circuit determines an operation time of the digital-to-analog converter based on the counting number of the digital logic circuit.

14. The LED driving circuit of claim 8, wherein the boost converter increases the driving voltage V_LED of the LED string in stages in response to a time period of the LED string driving voltage control signal generated by the feedback control circuit.

15. The LED driving circuit of claim 7, wherein the LED driving circuit drives LEDs in response to the timing of the external vertical synchronization signal VSYNC or the timing of the internal PWM clock signal irrespective of a display frame rate.

16. The LED driving circuit of claim 7, wherein the LED driving circuit does not perform on-off control of the output voltage V_CH of the LED string.

17. A driving method of a light emitting diode (LED), comprising:

monitoring an output voltage V_CH of an LED string and determining whether the output voltage V_CH is equal to or less than a reference voltage V_REF;

determining a feedback timing by counting clocks of an external vertical synchronization signal VSYNC or an internal PWM clock signal when the output voltage V_CH of the LED string is equal to or less than the reference voltage V_REF; and adjusting the intensity of the driving voltage V_LED of the LED string during the feedback timing.

18. The LED driving method of claim 17, wherein the monitoring of the output voltage V_CH of the LED string is performed by a headroom detection circuit provided at one end of the LED string, and comprises performing a clock counting operation of a digital logic circuit when the output voltage V_CH of the LED string is equal to or less than the reference voltage V_REF.

19. The LED driving method of claim 17, wherein the external vertical synchronization signal VSYNC or the internal PWM clock signal is transmitted to a multiplexer, and only one signal selected from the vertical synchronization signal and the PWM clock signal is transmitted to the digital logic circuit.

20. The LED driving method of claim 17, wherein the driving voltage V_LED of the LED string is boosted by a boost converter, and a boosting operation time of the boost converter is determined according to a counting criterion varying according to a state of the output voltage V_CH of the LED string.

* * * * *